US006769241B2

(12) United States Patent
Spanjers et al.

(10) Patent No.: US 6,769,241 B2
(45) Date of Patent: Aug. 3, 2004

(54) DESCRIPTION OF METHODS TO INCREASE PROPELLANT THROUGHPUT IN A MICRO PULSED PLASMA THRUSTER

(75) Inventors: Gregory G. Spanjers, Edwards AFB, CA (US); John Schilling, Rosamond, CA (US); David White, Rosamond, CA (US)

(73) Assignee: W. E. Research LLC, Rosamond, CA (US)

( * ) Notice: Subject to any disclaimer, the term of this patent is extended or adjusted under 35 U.S.C. 154(b) by 0 days.

(21) Appl. No.: 10/191,814

(22) Filed: Jul. 9, 2002

(65) Prior Publication Data
US 2003/0033797 A1 Feb. 20, 2003

Related U.S. Application Data
(60) Provisional application No. 60/304,219, filed on Jul. 9, 2001.

(51) Int. Cl.[7] ............................. G21D 1/00; H05B 1/00
(52) U.S. Cl. ...................... 60/203.1; 60/253; 60/256; 60/247
(58) Field of Search ..................... 60/253, 256, 247, 60/203.1

(56) References Cited

U.S. PATENT DOCUMENTS

| | | | |
|---|---|---|---|
| 5,847,315 A | 12/1998 | Katzakian, Jr. et al. | |
| 5,924,278 A | 7/1999 | Burton et al. | |
| 6,153,976 A | 11/2000 | Spanjers | |
| 6,216,445 B1 * | 4/2001 | Byers et al. | 60/203.1 |
| 6,269,629 B1 | 8/2001 | Spanjers | |
| 6,373,023 B1 | 4/2002 | Hoskins et al. | |

OTHER PUBLICATIONS

Altman et al., "Chapter 7: Hybrid Rocket Propulsion Systems," Published in Space Technology Series: Space Propulsion Analysis and Design, McGraw–Hill, 1995, pp. 365–441.
Ashby et al., "Quasi–Steady–State Pulsed Plasma Thrusters," AIAA Journal, vol. 4, No. 5, May 1966, pp. 831–835.
Aston et al., "Ignitor Plug Operation in a Pulsed Plasma Thruster," Journal of Spacecraft and Rockets, vol. 19, No. 3, May–Jun. 1982, pp. 250–256.
Barber et al., "Microthrusters Employing Catalytically Reacted N2–O2–H2 Gas Mixtures, Tridyne," Journal of Spacecraft and Rockets, vol. 8, No. 2, Feb. 1971, pp. 111–116.
Bartoli et al., "A Liquid Caesium Field Ion Source for Space Propulsion," J. Phys. D: Applied Phys., vol. 17, No. 12, Dec. 1984, pp. 2473–2483.
Bassner et al., "The Design of RITA Electric Propulsion System for Sat 2 (Artemis)," AIAA/DGLR/JSASS 21st International Electric Propulsion Conference, Jul. 1990, Orlando, Florida, AIAA Paper No. 90–2539, pp. 1–7.
Bayt et al., "A Performance Evaluation of MEMS–based Micronozzles," 33rd AIAA/ASME/SAE/ASEE Joint Propulsion Conference and Exhibit, Jul. 1997, Seattle Washington, AIAA Paper No. 97–3169, pp. 1–10.

(List continued on next page.)

Primary Examiner—Justine R. Yu
Assistant Examiner—William H. Rodriguez
(74) Attorney, Agent, or Firm—Christie, Parker & Hale, LLP

(57) ABSTRACT

Propellant modules for Micro Pulsed Plasma Thrusters, and techniques for bundling propellant modules and for using a two-stage discharge process to increase MicroPPT propellant throughput, and decrease the output voltage required from the power-processing unit are provided.

35 Claims, 13 Drawing Sheets

OTHER PUBLICATIONS

Beattie et al., "Flight Qualification of an 18–mN Xenon Ion Thruster," AIAA/AHS/ASEE Aerospace Design Conference, Feb. 1993, Irvine, California, AIAA Paper No. 93–1085, pp. 1–7.

Berkopec, "Performance of Two Subliming Solid–Propellant Thruster Systems for Attitude Control of Spacecraft," NASA Technical Note No. D–3841, Washington, D.C., Feb. 1967, pp. 1–15.

Blandino et al., "Propulsion Requirements and Options for the New Millennium Interferometer (DS–3) Mission," 34th AIAA/ASME/SAE/ASEE Joint Propulsion Conference and Exhibit, Jul. 1998, Cleveland, Ohio, AIAA Paper No. 98–3331, pp. 1–11.

Bromaghim et al., "An Overview of the On–Orbit Results From the Esex Flight Experiment," 35th AIAA/ASME/SAE/ASEE Joint Propulsion Conference and Exhibit, Jun. 1999, Los Angeles, California, AIAA Paper No. 99–2706, pp. 1–13.

Brown, "Spacecraft Propulsion, Chapters 1 and 3," AIAA Education Series, (1995), pp. 1–8 and 25–54.

Bryant et al., "Planetary Lander Vehicles Utilizing LEAP Technology," 30th AIAA/ASME/SAE/ASEE Joint Propulsion Conference, Jun. 1994, Indianapolis, Indiana, AIAA Paper No. 94–2748, pp. 1–7.

Burton et al., "Energy Balance and Efficiency of the Pulsed Plasma Thruster," 34th AIAA/ASME/SAE/ASEE Joint Propulsion Conference and Exhibit, Jul. 1998, Cleveland, OH, AIAA Paper No. 98–3808, pp. 1–10.

Burton et al., "Pulsed Plasma Thruster," Journal of Propulsion, vol. 14, No. 5, Sep.–Oct. 1998, pp. 716–735.

Bzibziak, Miniature Cold Gas Thrusters, 28th AIAA/ASME/SAE/ASEE Joint Propulsion Conference and Exhibit, Jul. 1992, Nashville, Tennessee, AIAA Paper No. 92–3256, pp. 1–7.

Craddock et al., "Design and Development of the Army KE ASAT ACS Thruster," 29th AIAA/ASME/SAE/ASEE Joint Propulsion Conference and Exhibit, Jun. 1993, Monterey, California, AIAA Paper No. 93–1959.

Cubbin et al., "Laser Interferometry for Pulsed Plasma Thruster Performance Measurement," 24th International Electric Propulsion Conference, Sep. 1995, AIAA Paper No. A96–30046, pp. 1313–1325.

de Groot et al., "Chemical Microthruster Options," 32nd AIAA/ASME/SAE/ASEE Joint Propulsion Conference, Jul. 1996, Lake Buena Vista, Florida, AIAA Paper No. 96–2868, pp. 1–16.

de Groot et al., "Preliminary Results of Solid Gas Generator Micropropulsion," 34th AIAA/ASME/SAE/ASEE Joint Propulsion Conference and Exhibit, Jul. 1998, Cleveland, Ohio, AIAA Paper No. 98–3225, pp. 1–9.

Driscoll et al., "Development Tests on a 5–lbf Bipropellant Thruster Using a Platinum/Rhodium Thrust Chamber," 34th AIAA/ASME/SAE/ASEE Joint Propulsion Conference and Exhibit, Jul. 1998, Cleveland, Ohio, AIAA Paper No. 98–3357, pp. 1–11.

Ebert et al., "Operational Nova Spacecraft Teflon Pulsed Plasma Thruster System," 25th AIAA/ASME/SAE/ASEE Joint Propulsion Conference, Jul. 1989, Monterey, California, AIAA Paper No. 89–2497, pp. 1–10.

Fehringer et al., "Space–Proven Indium Metal Field Ion Emitters for Ion Microthruster Applications," 33rd AIAA/ASME/SAE/ASEE Joint Propulsion Conference and Exhibit, Jul. 1997, Seattle, Washington, AIAA Paper No. 97–3057, pp. 1–11.

Fleeter, "Chapter 2: Propulsion –or–How to Get There," published in Microspacecraft,, The Edge City Press, Reston Virginia, 1995, pp. 7–44.

Forsythe, "Impulse and Thrust Test of a Subliming–Solid Micropropulsion System," NASA Technical note No. D–3245, Washington, D.C., Mar. 1966, 1–23.

Genovese et al., "Neurtalization Tests of a mN FEEP Thruster," 32nd AIAA/ASME/SAE/ASEE Joint Propulsion Conference and Exhibit, Jul. 1996, Lake Buena Vista, Florida, AIAA Paper No. 96–2725, pp. 1–6.

Gorshkov, "Low–Power Hall Type and Ion Electric Propulsion for the Small Sized Spacecraft," 34th AIAA/ASME/SAE/ASEE Joint Propulsion Conference and Exhibit, Jul. 1998, Cleveland, Ohio, AIAA Paper No. 98–3929, pp. 1–8.

Greer et al., "Dynamic Performance of a Subliming Solid Reaction Jet," IFAC Symposium on Automatic Control In Space, Sep. 1967, Vienna, Austria, Paper No. A67–39152, pp. 1–16.

Guman et al., "Exhaust Plume Studies of a Pulsed Plasma Thruster," AIAA/DGLR 13th International Electric Propulsion Conference, Apr. 1978, San Diego, California, AIAA Paper No. 78–704, pp. 1–8.

Guman et al., "Pulsed Plasma Microthruster for Synchronous Meteorological Satellite (SMS)," AIAA 10th Electric Propulsion Conference, Oct.–Nov. 1973, Lake Tahoe, Nevada, AIAA Paper No. 73–1066, pp. 1–9.

Guman et al., "Pulsed Plasma Microthruster Propulsion System for Synchronous Orbit Satellite," Journal of Spacecraft and Rockets, vol. 7, No. 4, Apr. 1970, pp. 409–415.

Haag, "PPT Thrust Stand," 31st AIAA/ASME/SAE/ASEE Joint Propulsion Conference and Exhibit, Jul. 1995, San Diego, California, AIAA Paper No. 95–2917, pp. 1–12.

Hardt et al., "The Chemistry of Subliming Solids for Micro Thrust Engines" Astronautica Acta., vol. 11, No. 5, Sep.–Oct. 1965, pp. 340–347.

Heister, "Chapter 6: Solid Rocket Motors", Space Propulsion Analysis and Design, McGraw–Hill, Inc., 1995, pp. 295–363.

Helmy, "Chronicle Review of the Hybrid Rocket Combustion," 30th AIAA/ASME/SAE/ASEE Joint Propulsion Conference, Jun. 1994, Indianapolis, Indiana, AIAA Paper No. 94–2881, pp. 1–5.

Hodge et al., "Development and Test of the ASAT Bipropellant Attitude Control System (ACS) Engine," 29th AIAA/ASME/SAE/ASEE Joint Propulsion Conference and Exhibit, Jun. 1993, Monterey, California, AIAA Paper No. 93–2587, pp. 1–10.

Huberman et al., "Advanced High–Thrust Colloid Sources," Journal of Spacecraft and Rockets, vol. 11, No. 7, Jul. 1974, pp. 475–480.

Jacobson et al., "Test Results of a 200 W Class Hall Effect Thruster," 34th AIAA/ASME/SAE/ASEE Joint Propulsion Conference and Exhibit, Jul. 1998, Cleveland, Ohio, AIAA Paper No. 98–3792, pp. 1–9.

Jankovsky, "HAN–Based Monopropellant Assessment for Spacecraft," 32nd AIAA/ASME/SAE/ASEE Joint Propulsion Conference, Jul. 1996, Lake Buena Vista, Florida, AIAA Paper No. 96–2863, pp. 1–7.

Jankovsky et al., "Performance of a FAKEL K10K Resistojet," 33rd AIAA/ASME/SAE/ASEE Joint Propulsion Conference and Exhibit, Jul. 1997, Seattle, Washington, AIAA Paper No. 97–3059, pp. 1–11.

Jones, "Coffee–can–sized Spacecraft," Aerospace America, vol. 26, No. 10 Oct. 1988, pp. 36–38.

Jones, "Electromagnetically Launched Microspacecraft for Space Science Missions," AIAA Aerospace Sciences Conference, Jan. 1988, Reno, Nevada, AIAA Paper No. 88–0068, pp. 1–9.

Jones, "Microspacecraft Missions and Systems," Journal of the British Interplanetary Soc., vol. 42, No. 10, Oct. 1989, pp. 448–454.

Jones et al., "Microspacecraft Technology for Planetary Science Missions," 42nd Congress of the international Astronautical Federation, Oct. 1991, Montreal, Canada, IAF paper No. 91–051, pp. 1–10.

Jones, "Think Small—in Large Numbers," Aerospace America, vol. 27, No. 10, Oct. 1989, pp. 14–17.

Kanning, "Measured Performance of Water Vapor Jets for Space Vehicle Attitude Control Systems," NASA Technical Note D–3561, Aug. 1966, pp. 1–24.

Ketsdever et al., "The Free Molecule Micro–Resistojet: An Interesting Alternative to Nozzle Expansion" 34th AIAA/ASME/SAE/ASEE Joint Propulsion Conference and Exhibit, Jul. 1998, Cleveland, Ohio, AIAA Paper No. 98–3918, pp. 1–16.

Khayms et al., "Design of a Miniaturized Hall Thruster for Microsatellites," 32nd AIAA/ASME/SAE/ASEE Joint Propulsion Conference, Jul. 1996, Lake Buena Vista, Florida, AIAA Paper No. 96–3291, pp. 1–7.

Kidd et al., "Life Test (4350 Hours) of an Advanced Colloid Thruster Module," AIAA 10th Electric Propulsion Conference, Nov. 1973, Lake Tahoe, Nevada, AIAA Paper No. 73–1078, pp. 1–10.

Kindsvater, "Simplified Space Mechanisms Using Subliming Solids," First Aerospace Mechanisms Symposium, May 1966, Santa Clara, California, pp. 239–249.

Lawrence et al., "Performance Testing of a Resistojet Thruster for Small Satellite Applications," 34th AIAA/ASME/SAE/ASEE Joint Propulsion Conference and Exhibit, Jul. 1998, Cleveland, Ohio, AIAA Paper No. 98–3933, pp. 1–15.

MacClellan et al., "Lincoln Experimental Satellites 5 and 6," AIAA 3rd Communications Satellite Systems Conference, Apr. 1970, Los Angeles, California, AIAA Paper No. 70–494, pp. 1–11.

Mahoney et al., "Electrohydrodynamic Ion Source," J. Applied Physics, vol. 40, No. 13, Dec. 1996, pp. 5101–5106.

Marcuccio et al., Development of a Miniaturized Field Emission Propulsion System:, 34th AIAA/ASME/SAE/ASEE Joint Propulsion Conference and Exhibit, Jul. 1998, Cleveland, Ohio, AIAA Paper No. 98–3919, pp. 1–5.

Marcuccio et al., "Flight Demonstration Opportunities for FEEP (Field Emission Electric Propulsion)," 32nd AIAA/ASME/SAE/ASEE Joint Propulsion Conference and Exhibit, Jul. 1996, Lake Buena Vista, Florida, AIAA Paper No. 96–2724, pp. 1–14.

Marcuccio et al., "Flight Demonstration of FEEP on Get Away Special," 34th AIAA/ASME/SAE/ASEE Joint Propulsion Conference and Exhibit, Jul. 1998, Cleveland, Ohio, AIA Paper No. 98–3332, pp. 1–11.

Marrese et al., "Chapter 11: Performance of Field Emission Cathodes in Xenon Electric Propulsion System Environments," Published in Progress in Astronautics and Aeronautics: Micropropulsion for Small Spacecraft, vol. 187, pp. 271–302.

Martinez–Sanchez et al., "Spacecraft Electric Propulsion—An Overview," Journal of Propulsion and Power, vol. 14, No. 5, Sep./Oct. 1998, pp. 688–699.

Maycock et al., "A photochemical Microrocket for Attitude Control," Journal Spacecraft and Rockets, vol. 6, No. 3, Mar. 1969, pp. 336–337.

McFall et al., "Pulsed Thruster Thrust Stand Measurement Evaluations," 34th AIAA/ASME/SAE/ASEE Joint Propulsion Conference and Exhibit, Jul. 1998, Cleveland, Ohio, AIAA Paper No. 98–3805, pp. 1–8.

McGrath, "The History of Thiokol STAR™ Motor Missions," 31st AIAA/ASME/SAE/ASEE Joint Propulsion Conference and Exhibit, Jul. 1995, San Diego, California, AIAA Paper No. 95–3129, pp. 1–10.

McGrath, "STAR™ Motors with Movable Nozzles," 31st AIAA/ASME/SAE/ASEE Joint Propulsion Conference and Exhibit, Jul. 1995, San Diego, California, AIAA Paper No. 95–3020, pp. 1–8.

Meinhardt, et al., "Development and Testing of New, HAN–Based Monopropellants in Small Rocket Thrusters," 34th AIAA/ASME/SAE/ASEE Joint Propulsion Conference and Exhibit, Jul. 1998, Cleveland, Ohio, AIAA Paper No. 98–4006, pp. 1–10.

Mendel, C.W., et al., "Carbon Plasma Gun," Rev. Sci. Instrum., Dec. 1980, vol. 51, No. 12, pp.1641–1644.

Mittendorf et al., "Experimental Development of a Monopropellant for Space Craft Propulsion Systems," 33rd AIAA/ASME/SAE/ASEE Joint Propulsion Conference and Exhibit, Jul. 1997, Seattle, Washington, AIAA Paper No. 97–2591, pp. 1–9.

Mitterauer, "Contamination Test of a Cesium Field Ion Thruster," Journal of Propulsion and Power, vol. 7, No. 3, May–Jun. 1991, pp. 364–366.

Mitterauer, "Field Emission Electric Propulsion: Emission Site Distribution of Slit Emitters," IEEE Transactions on Plasma Science, vol. PS–15, No. 5, Oct. 1987, pp. 593–598.

Mitterauer, "Miniaturized Liquid Metal Ion Sources (MILMIS)," IEEE Transactions on Plasma Science, vol. 19, No. 5, Oct. 1991, pp. 790–798.

Mueller et al., "Chapter 8: Vaporizing Liquid Micro–Thruster Concept: Preliminary Results of Initial Feasibility Studies," Published in Progress in Astronautics and Aeronautics: Micropropulsion for Small Spacecraft, vol. 187, 2000, pp. 215–230.

Mueller et al., "Chapter 12: Electric Breakdown Characteristics of Silicon Dioxide Films for Use in Microfabricated ion Engine Accelerator Grids," Published in Progress in Astronautics and Aeronautics: Micropropulsion for Small Spacecraft, vol. 187, pp. 303–334.

Mueller et al., "Chapter 17: Micro–isolation Valve Concept: Initial Results of a Feasibility Study," Published in Progress in Astronautics and Aeronautics: Micropropulsion for Small Spacecraft, vol. 187, 2000, pp. 399–422.

Mueller et al. "Design of Tridyne Pressurization Systems for Liquid Oxygen Polybutadiene Hybrid Rocket Motors," 27th AIAA/ASME/SAE Joint Propulsion Conference, Jun. 1991, Sacramento, California, AIAA Paper No. 91–2406, pp. 1–6.

Mueller, "Thruster Options for Microspacecraft: A Review and Evaluation of Existing Hardware and Emerging Technologies," 33rd AIAA/ASME/SAE/ASEE Joint Propulsion Conference and Exhibit, Jul. 1997, Seattle, Washington, AIAA Paper No. 97–3058, pp. 1–29.

Myers et al., "Pulsed Plasma Thruster Contamination," 32nd AIAA/ASME/SAE/ASEE Joint Propulsion Conference, Jul. 1996, Lake Buena Vista, Florida, AIAA Paper No. 96–2729, pp. 1–12.

"NASA Contractor Report: Development of the Subliming Solid Control Rocket: Phase II," Prepared by Rocket Research Corporation, NASA Report No. CR–712, Washington, DC, Mar. 1967, pp. 1–104.

"NASA Contractor Report: Subliming Solid Control Rocket: Phase 1," Prepared by Rocket Research Corporation, NASA Report No. CR–711, Washington, DC, Mar. 1967, pp. 1–151.

Owens, Jr., "An Experimental Investigation of Superheated Subliming Solid Thruster Performance," Journal of Spacecraft and Rockets, vol. 8, No. 7, Jul. 1971, pp. 806–809.

Owens, Jr., "Design Aspects of Subliming Solid Reaction Control Systems," ICRPG/AIAA 3rd Solid propulsion Conference, Jun. 1968, Atlantic City, New Jersey, AIAA Paper No. 68–516, pp. 1–20.

Patterson, "Low–Power Ion Thruster Development Status," 34th AIAA/ASME/SAE/ASEE Joint Propulsion Conference and Exhibit, Jul. 1998, Cleveland, Ohio, AIAA Paper No. 98–3347, pp. 1–12.

Perel et al., "Air Force Electric Propulsion Programs," AIAA International Electric Propulsion Conference, Nov. 1976, Key Biscayne, Florida, AIAA Paper No. 76–1067, pp. 1–5.

Perel, "Alkali Metal Ion Sources," J. Electrochem. Soc., vol. 115, No. 12, Dec. 1968, pp. 343–350.

Perel et al., "Investigation of the Capillaritron Ion Source for Electric Propulsion," AIAA/JSASS/DGLR 15th International Electric Propulsion Conference, Apr. 1981, Las Vegas, Nevada, AIAA Paper No. 81–0747, pp. 1–6.

Perel et al., "Research on Charged Particle Bipolar Thrustor," AIAA Electric Propulsion and Plasmadynamics Conference, Sep. 1967, Colorado Springs, Colorado, AIAA Paper No. 67–728, pp. 1–12.

Petagna, "Field Emission Electric Propulsion (FEEP): Experimental Investigation on Continuous and Pulsed Modes of Operation," Mar. 1988, IEPC Paper No. 88–127, pp. 708–721.

Pfeffer et al., "The Electric Propulsion Activities of the European Space Agency": AIAA/DGLR 13th International Electric Propulsion Conference, Apr. 1978, San Diego, California, AIAA Paper No. 78–713, pp. 1–10.

Rosenberg et al., New Generation of High–Performance Engines for Spacecraft Propulsion, Journal of Propulsion and Power, Jan.–Feb. 1994, vol. 10, No. 1, pp. 40–46.

Rudolph et al., "Pulsed Plasma Thruster Backflow Characteristics," AIAA/SAE/ASME 25th Joint Propulsion Conference, Jun. 1979, Las Vegas, Nevada, AIAA Paper No. 79–1293 pp. 1–8.

Rudolph et al., "Pulsed Plasma Thruster Contamination Studies," Princeton/AIAA/DGLR 14th International Electric Propulsion Conference, Oct.–Nov. 1979, Princeton, New Jersey, AIAA Paper No. 79–2106, pp. 1–8.

Ruttle et al., "Development of Miniature 35–LBF Fast Response BiPropellant Divert Thruster," 29th AIAA/ASME/SAE/ASEE Joint Propulsion Conference and Exhibit, Jun. 1993, Monterey, California, AIAA Paper No. 93–2585, pp. 1–2.

Schaub et al., "Spacecraft Formation Flying Control Using Mean Orbit Elements," Astrodynamics 1999: Part I Advances in the Astronomical Sciences Proceedings of the AAS/AIAA Astrodynamics Conference, Aug. 1999, vol. 103, pp. 163–181.

Schilling et al., "Micropropulsion Options for the TechSat21 Space–Based Radar Flight," Progress in Astronautics and Aeronautics, Jan. 1999, vol. 187, pp. 3–23.

Schwende et al., "New Generation of Low Thrust Bi–Propellant Engines in Qualification Process," 29th AIAA/ASME/SAE/ASEE Joint Propulsion Conference and Exhibit, Jun. 1993, Monterey, California, AIAA Paper No. 93–2120, pp. 1–10.

Sciulli et al., "Self Consuming Satellite Program," AIAA Space Technology Conference & Exposition, Sep. 1999, Albuquerque, New Mexico, AIAA Paper No. 99–4480, pp. 1–6.

Sellers et al., "A Low–Cost Propulsion Option for Small Satellites," Journal of the British Interplanetary Soc., Mar. 1995, vol. 48, pp. 129–138.

Spanjers et al., "Effect of Propellant Temperature on Efficiency in the Pulsed Plasma Thruster," Journal of Propulsion and Power, vol. 14, No. 4, Jul.–Aug. 1998, pp. 545–553.

Spanjers et al., "Investigation of Propellant Inefficiencies in a Pulsed Plasma Thruster," 32nd AIAA/ASME/SAE/ASEE Joint Propulsion Conference, Jul. 1996, Lake Buena Vista, Florida, AIAA Paper No. 96–2723, pp. 1–11.

Spanjers et al., "PPT Research at AFRL: Material Probes to Measure the Magnetic Field Distribution in a Pulsed Plasma Thruster," 34th AIAA/ASME/SAE/ASEE Joint Propulsion Conference and Exhibit, Jul. 998, Cleveland, Ohio, AIAA Paper No. 98–3659, pp. 1–16.

Spanjers et al., "Propellant Losses Because of Particulate Emission in a Pulsed Plasma Thruster," Journal of Propulsion and Power, vol.14, No. 4, Jul.–Aug. 1998, pp. 554–559.

Staehle, "Small Planetary Missions for the Space Shuttle," Astronautical Society Annual Meeting, Oct.–Nov. 1979, Los Angeles, California, Paper No. 79–288, pp. 1–24.

Strand et al., "Extended Duty Cycle Testing of Spacecraft Propulsion Miniaturized Components," 31st AIAA/ASME/SAE/ASEE Joint Propulsion Conference and Exhibit, Jul. 1995, San Diego, California, AIAA Paper No. 95–2810, pp. 1–11.

Sutherland et al, "A Review of Microrocket Technology: $10^{-6}$ to 1 lbf Thrust," Journal Spacecraft and Rockets, vol. 3, No. 8, Aug. 1966, pp. 1153–1165.

Sutton, "Chapter 19: Electric Propulsion," published in Rocket Propulsion Elements: An Introduction to the Engineering of Rockets, 6th Ed, Wiley, 1992, pp. 565–611.

Tinling, "Measured Steady–State Performance of Water Vapor Jets for Use in Space Vehicle Attitude Control Systems," NASA Technical Note D–1302, May 1962, pp. 1–21.

Turchi et al., "Optimization of Pulsed Plasma Thrusters for Microsatellite Propulsion," 35th AIAA/ASME/SAE/ASEE Joint Propulsion Conference and Exhibit, Jun. 1999, Los Angeles, California, AIAA Paper No. 99–2301, pp. 1–15.

Vondra et al., "A Flight Qualified Pulsed Electric Thruster for Satellite Control," AIAA 10th Electric Propulsion Conference, Oct.–Nov. 1973, Lake Tahoe, Nevada, AIAA Paper No. 73–1067, pp. 1–7.

Vondra et al., "Flight Qualified Pulsed Electric Thruster for Satellite Control," Journal of Spacecraft and Rockets, Sep. 1974, vol.11, No. 9, pp. 613–617.

Wernimont et al., "Hydrogen Peroxide Hybrid Rocket Engine Performance Investigation," 30th AIAA/ASME/SAE/ASEE Joint Propulsion Conference, Jun. 1994, Indianapolis, Indiana, AIAA Paper No. 94–3147, pp. 1–7.

Wichmann et al., "Miniature High Performance Delta V Engine," 29th AIAA/ASME/SAE/ASEE Joint Propulsion Conference and Exhibit, Jun. 1993, Monterey, California, AIAA Paper No. 93–2582, pp. 1–5.

Williams et al., "Performance Testing of a Solid Propellant Pulsed Plasma Microthruster," AIAA 9th Electric Propulsion Conference, Apr. 1972, Bethesda, Maryland, AIAA Paper No. 72–460, pp 1–16.

Young, et al., "Investigation of a Candidate Non–Magnetic Ion Micro–Thruster for Small Spacecraft Applications," 34th AIAA/ASME/SAE/ASEE Joint Propulsion Conference and Exhibit, Jul. 1998, Cleveland, Ohio, AIAA Paper No. 98–3917, pp. 1–13.

Sutton, "Chapter 19: Electric Propulsion," published in Rocket Propulsion Elements: An Introduction to the Engineering of Rockets, 6th Ed, Wiley; 1992; pp. 565–611.

* cited by examiner

Prior Art

Prior Art

DESCRIPTION OF METHODS TO INCREASE PROPELLANT THROUGHPUT IN A MICRO PULSED PLASMA THRUSTER

CROSS-REFERENCE TO RELATED APPLICATION

This application claims priority on U.S. provisional application No. 60/304,219 filed on Jul. 9, 2001, the content of which is incorporated herein by reference.

STATEMENT REGARDING FEDERALLY SPONSORED RESEARCH OR DEVELOPMENT

The U.S. Government has certain rights in this invention pursuant to SBIR Contract No. F04611-00-C-0020, awarded by the Air Force Research Laboratory, Propulsion Directorate, Edwards AFB, Calif.

FIELD OF INVENTION

The invention relates to propellant designs in Micro Pulsed Plasma Thrusters, and particularly to techniques for bundling propellant modules and for using a two-stage discharge process to increase MicroPPT propellant throughput, and decrease the output voltage required from the power-processing unit.

BACKGROUND OF INVENTION

Micro Pulsed Plasma Thrusters (MicroPPTs) are small thrusters used for propulsion and attitude control on spacecraft. The MicroPPTs are designed to provide spacecraft propulsion at low power levels (<20 W), in small reproducible impulse bits of thrust, and be contained in a very small lightweight package (<200 grams). For 100-kg class microsatellites, MicroPPTs can provide propulsive attitude control and at least partial stationkeeping propulsion. For 25-kg class or smaller satellites, MicroPPTs can provide all primary propulsion, as well as stationkeeping and attitude control.

While MicroPPTs retain some design similarity with standard PPTs, they are fundamentally different in critical areas that enable the required reductions in mass, size, and power. For example, the LES-8/9 PPT, designed and flight tested in the 1970s and shown schematically in FIG. 1 and in the photograph of FIG. 2, a DC—DC converter charges an integrated capacitor from a 28-V spacecraft bus to 1500 V. Then, a second DC—DC converter supplies 600 V to a smaller capacitor in the trigger circuit.

Modern flight units operate in a similar regime. The PPT discharge is initiated by a TTL pulse applied to a semiconductor switch in a trigger circuit. The trigger discharge fires a sparkplug embedded in the cathode, providing enough surface ionization or seed plasma to initiate a main discharge across a Teflon™ propellant face. The solid propellant is converted to vapor and partially ionized by the electric discharge. Acceleration is accomplished by a combination of thermal and electromagnetic forces to create usable thrust. As the propellant is consumed, over some 17 million discharges, a negator spring passively feeds the 25-cm-long propellant bar forward between the electrodes.

Although such systems have been well-tested, the required integration of two separate discharge circuits and two separate DC—DC converters dramatically increases the size of the discharge capacitor and the complexity of the PPT propulsion system. MicroPPTs reduce the need for these duplicative and complicated triggering electronics schemes.

Accordingly, the primary difference between the standard PPT and the MicroPPT lies in the electronics. By reducing the size of the thruster, it becomes possible to initiate the discharge by simple over-voltage breakdown at the propellant face, rather than requiring a separate spark trigger. This eliminates one of the two separate discharge circuits and DC—DC converters required in a conventional PPT, and dramatically reduces the size of the discharge capacitor.

However, although the electronics for these MicroPPTs are much improved, the MicroPPT propellant throughput is fundamentally limited. Adding propellant requires the use of a longer propellant rod or a larger diameter propellant rod. A longer rod becomes impractical for spacecraft integration after approximately 12 inches from a geometric packing perspective. Furthermore, for designs where the propellant recesses back into the electrode shell over time, viscous losses with the wall may decrease thrust. In addition, larger diameter propellants are problematic for the DC—DC converter since higher voltages are needed to initiate the surface discharge.

For example, Laboratory tests have defined two critical design criteria for MicroPPT propellants. First, the voltage required to initiate the surface breakdown increases with propellant diameter since the path length between the inner and outer electrodes increases. Second, the average energy per discharge pulse must increase with propellant face area in order to facilitate complete decomposition of the propellant surface. Insufficient energy leads to charring at the propellant face, which dramatically increases the voltage required to initiate the discharge. This voltage increase is considered a failure mechanism for the MicroPPT.

Accordingly, a need exists for an improved propellant design with large cross-sectional area that also has a lower surface breakdown voltage.

SUMMARY OF INVENTION

The present invention relates to propellant designs in Micro Pulsed Plasma Thrusters, and particularly to techniques for creating propellant modules capable of increasing MicroPPT propellant throughput, and decreasing the output voltage required from the power-processing unit.

In one embodiment, several modules of relatively smaller diameter are fabricated into a bundle. Such devices are referred to as "Bundled" propellant designs. In such a "bundled" embodiment the MicroPPT could be designed to use one propellant rod until consumed, and then passively switch to the next one.

In another embodiment, a single module of relatively large cross-section is utilized and ignited using a two-stage ignition process. Such devices are referred to as "Two-Stage" propellant designs.

In yet another embodiment, the invention is directed to thrusters utilizing such propellant modules. The propellant modules of the current invention may be utilized in either MicroPPT or Pulsed Plasma Thruster (PPT) designs. In addition, the propellant modules of the current invention may be utilized in any of the MicroPPT designs listed above and only differ in how the high voltage pulse is electrically generated and then applied to the propellant.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
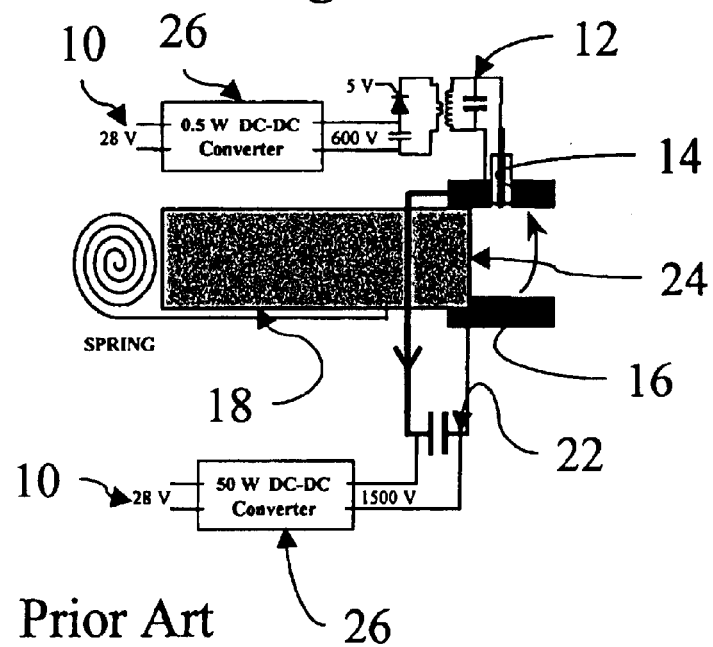
FIG. 1 is a schematic of one embodiment of a prior art pulsed plasma thruster.

The present invention is directed to propellant modules for Micro Pulsed Plasma Thrusters, and particularly to bundled propellant modules and propellant modules designed to utilize a two-stage discharge process to increase MicroPPT propellant throughput, and decrease the output voltage required from the power-processing unit.

As described above, and shown schematically both in FIGS. 1 and 2 above and FIGS. 3 to 6, all PPTs and MicroPPTs generally comprise five main components: a power supply 10, triggering electronics 12, at least one cathode 14, at least one anode 16, and a propellant source 18.

Three classes of triggering electronics designs have been developed and tested for these MicroPPTs. The Triggered MicroPPT (Spanjers, U.S. Pat. No. 6,153,976); the Self-Triggering MicroPPT (ST MicroPPT), (Spanjers AFB00503 disclosure, Provisional patent application No. 09/518,164, filed Mar. 6, 2000); and the Quasi-Steady MicroPPT (QS MicroPPT), shown schematically in FIGS. 3 to 5.

The Triggered MicroPPT design (FIG. 3) uses a switch 20 to create a pulsed discharge across the propellant 18. A capacitor 22 within the pulser circuit is charged to a high voltage (600V-3000V typical). No voltage appears across the electrodes 14 and 16 because of the switch 20 placed in electrical series between the capacitor 22 and the electrodes. To fire the Triggered MicroPPT, a separate low-voltage signal command closes the switch, allowing the high voltage to appear in a pulsed fashion across the electrodes. With judicious choice of propellant geometry and discharge voltage, an over-voltage condition is created at the propellant face 24. In such a condition, the applied voltage exceeds the surface breakdown voltage, causing a discharge arc to form and conduct current across the propellant 18. Propellant is then vaporized, ionized, and accelerated in manner similar to that of the standard PPT. Due primarily to the elimination of the sparkplug and associated circuitry, laboratory Triggered MicroPPTs have been fabricated with dry masses (total system mass not including propellant mass) of about 500 grams. This is more than a 10 times reduction from the 6.6 kg dry mass of the standard PPT.

Figure 4:
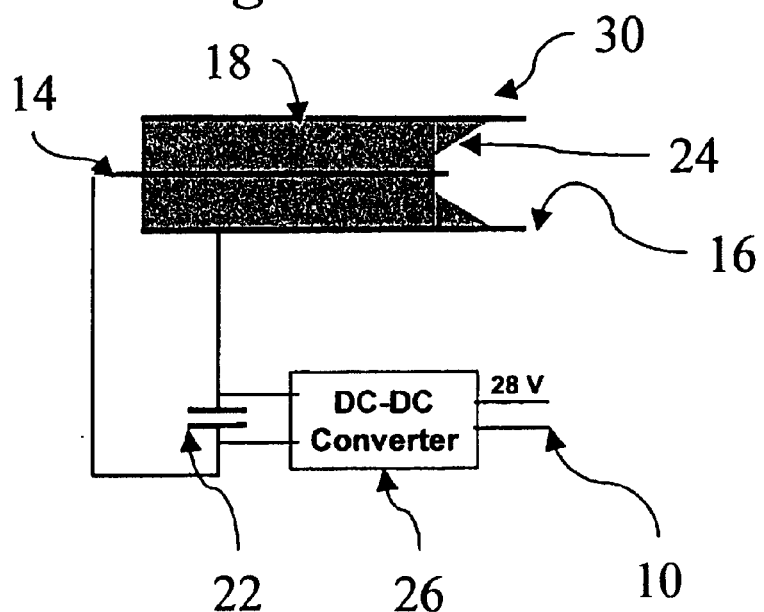
FIG. 4 is a schematic of one embodiment of a prior art self-triggered micro pulsed plasma thruster.

The Self-Triggering MicroPPT, shown schematically in FIG. 4, is a further simplification of the triggered design. In this design the switch and the requirement for a separate low-voltage command pulse to the trigger are eliminated. The DC—DC converter 26 applies the high-voltage charge directly to the propellant face 24. Energy is stored in the capacitor 22 electrically connected in parallel with the propellant 18. When the DC—DC converter is energized, the voltage increases as the supplied current energizes the capacitor. When the charge voltage exceeds the surface breakdown voltage at the propellant face, the discharge self-ignites. However, the precise firing time of an individual discharge from the ST MicroPPT cannot be controlled and the surface breakdown voltage will vary considerably from shot-to-shot due to factors such as electrode roughness, surface contaminants, and irregularities in the propellant surface. The advantage of the ST MicroPPT is that the dry mass of the propulsive system is reduced to 100 grams in laboratory designs. Further, the design eliminates the switch, which is a high risk component and a potential source of failure in the triggered design.

Figure 5:
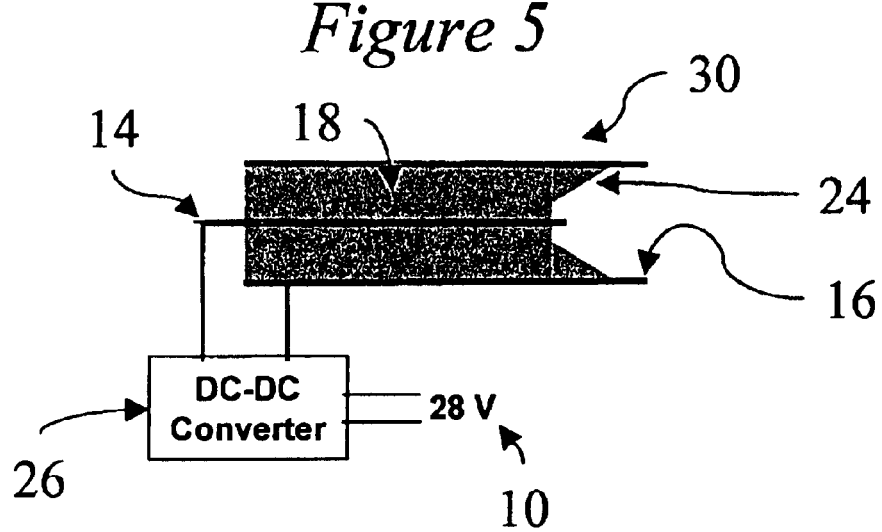
FIG. 5 is a schematic of one embodiment of a prior art quasi-steady micro pulsed plasma thruster.
Figure 6:
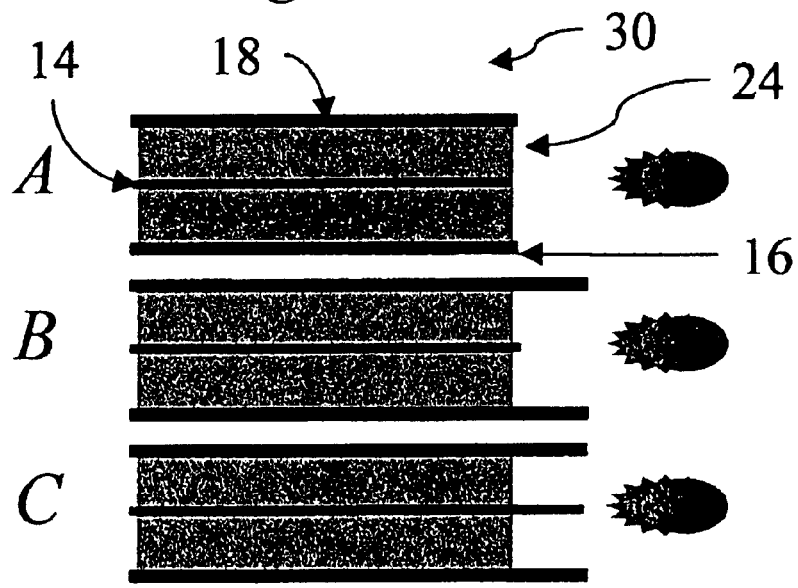
FIG. 6a is a schematic of a first embodiment of a propellant feed system.
FIG. 6b is a schematic of a second embodiment of a propellant feed system.
FIG. 6c is a schematic of a third embodiment of a propellant feed system.

Finally, the Quasi-Steady MicroPPT is a further simplification of the ST MicroPPT, and is shown schematically in FIG. 5. In this case the separate capacitor used in the ST MicroPPT has been eliminated. High voltage from the DC—DC converter 26 appears very quickly (~1 ms) at the propellant face 24. Energy storage for the discharge can come from one of three sources. First, the propellant module itself acts as a small capacitor. Second, flyback voltage amplification typically used in DC—DC converters will provide inductive energy storage. Third, the output filter of typical DC—DC converters will have significant capacitance to smooth the high frequency oscillations into a DC current source. Each of these energy storage sources has a much lower electrical impedance than the external capacitor used in the ST MicroPPT design. Thus, the voltage rise on the propellant module will be much faster, and the recharge time between firings, for a fixed input current, will be much faster. The net result is that a 5-Watt QS MicroPPT typically fires in a 1 kHz to 30 kHz range, compared to a 1 to 3 Hz range for the previous MicroPPT designs.

The QS MicroPPT has 3 major advantages over the previous designs. First, the relatively high frequency of discharge (>1 kHz) virtually eliminates the possibility of exciting a structural resonance in the spacecraft. In addition, issues associated with the non-precise firing time control of the ST MicroPPT are also eliminated since the firing response of the QS MicroPPT is 4000 times faster. Second, eliminating the external capacitor enables a further reduction in dry mass. Laboratory versions of the QS MicroPPT have been fabricated with a dry mass of only 60 grams. Third, because less than 1 ms separates sequential firings, a QS MicroPPT discharge will occur while propellant is still being vaporized from the previous discharge. Research has shown a PPT electrical discharge to typically occur over a 5-microsecond timeframe. Following the electrical discharge, the propellant will continue to vaporize material from the propellant face in order to convect away the excess heat that was deposited during the discharge. This convection process has been shown to continue for up to 5 ms, consuming 90% of the propellant consumed during the firing, while creating essentially zero thrust. Thus, in the QS MicroPPT discharge pulse it is expected that residual vapor from the previous discharge will still be evolving from the surface. The presence of this vapor will enable the QS MicroPPT to operate at lower voltages, and it will also make more efficient use of propellant since the new current pulse can accelerate propellant that would have simply drifted away at thermal velocities in previous designs.

Figure 3:
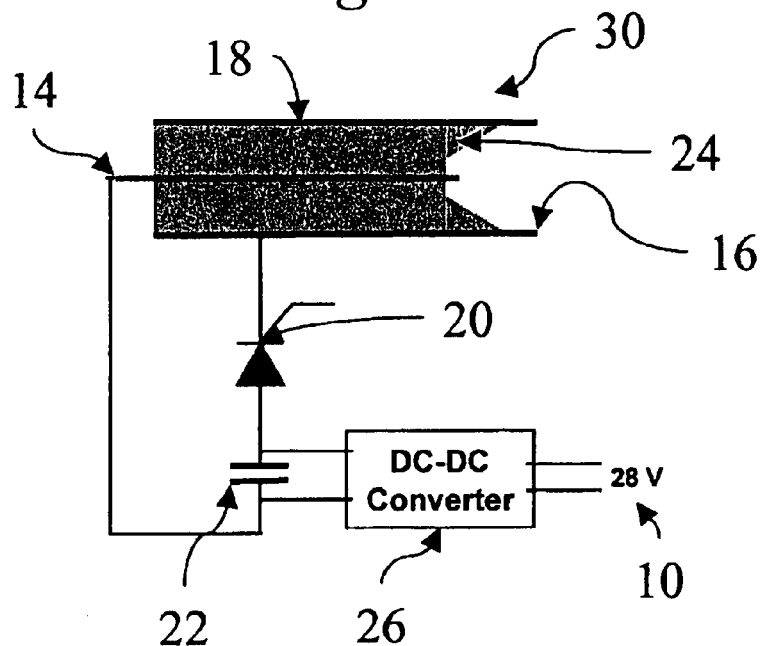
FIG. 3 is a schematic of one embodiment of a prior art triggered micro pulsed plasma thruster.

As shown in FIGS. 3 to 5, although the power supply and triggering electronics can take any suitable form and show considerable variation such MicroPPT designs utilize a similar standard propellant module. The term 'module' is used here in recognition of the fact that the MicroPPT uses an integrated construction of cathode 14, anode 16, and propellant 18 manufactured as an integral module 30. In such a design the propellant 18 is ignited by discharging an ignition voltage across the exposed face of the propellant 24. Accordingly, the voltage required to ignite the propellant will depend on the distance between the electrodes 14 and 16. However, it has been found that by varying the placement, number and geometry of the propellant and electrodes, a low voltage discharge may be utilized to ignite a greater mass of propellant. Accordingly, the propellant modules of the current invention increase MicroPPT propellant throughput, and decrease the output voltage required from the power-processing unit.

Figure 2:
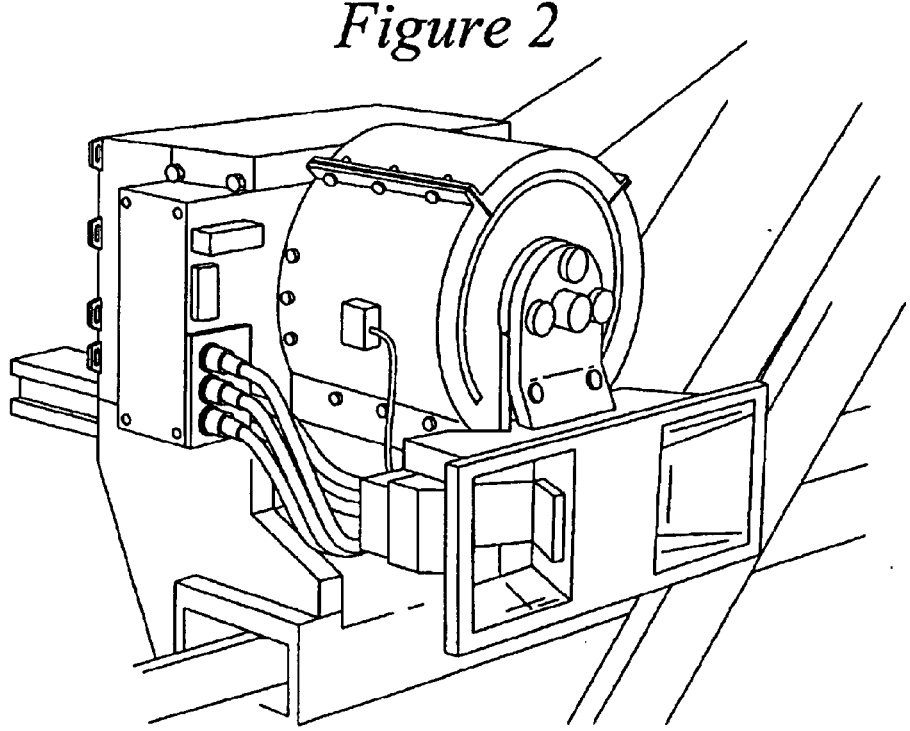
FIG. 2 is a photograph of one embodiment of a prior art pulsed plasma thruster.

Although these improved propellant modules may utilize any propellant geometry, such as rectangular or coaxial geometry, preferably the coaxial geometry is used for the Micro-PPTs since unwanted voltage breakdowns, due to edge effects, are expected to be more problematic as the scale size is reduced. As shown in FIGS. 2 to 4, the coaxial geometry of the Micro-PPTs generally consists of an inner conductive cathode 14 and an outer conductive shell for the anode 16. The propellant 18 is an annular rod of inert material such as, for example, Teflon™ between the two concentric cylindrical electrodes. The manufacturing of the electrodes and propellant in an integrated module 20 enables the MicroPPT to achieve further reductions in size, mass, and complexity.

In addition, although a spring fed propellant design is described for the PPTs shown in FIGS. 1 and 2, alternatively the propellant 18 may be designed to feed passively by simply eroding back to reduce the overall length of the propellant piece. In such a system no separate springs or other mechanical feed systems are necessary.

By varying the electrode thickness and material, three propellant feed scenarios are possible, as illustrated in FIGS. 6a to 6c. In FIG. 6a, the module is designed so that the anode, cathode, and propellant all recede at the same rate. In FIG. 6b, the propellant and inner cathode electrode recede, leaving the outer shell in place when the propellant is consumed. In FIG. 6c, only the propellant recedes leaving both the inner cathode and outer anode in place. Each of these designs has specific advantages and disadvantages, depending on the application. For example, the design of FIG. 6a has the minimum dry mass, since the metal electrode materials are ablated and accelerated with the propellant to create thrust. The design of FIG. 6b leave the exit plane of the thruster fixed in space, thus easing spacecraft integration issues associated with potential MicroPPT contamination of critical spacecraft surfaces. Meanwhile, the design of FIG. 6c has the potential for the discharge current to continue accelerating the plasma while it transverses the distance between the thruster and the exit plane, and thereby may provide the most energy efficient operation.

Although alternative suitable designs within the basic concept of this patent may be created, two exemplary improved propellant module designs are disclosed herein: the two-stage and the bundled propellant modules.

Embodiments of the two-stage propellant module according to the current invention are shown schematically in FIGS. 7 to 13. The two-stage propellant modules are designed with a relatively large cross-sectional area and the capability to ignite at a lower surface breakdown voltage than conventional designs.

The improved properties of the two-stage propellant modules, as shown in FIGS. 7 to 13, is obtained by providing the propellant in a group consisting of different diameters and different lengths for the discharge paths. For example, as shown, the discharge in these two-stage propellant modules initiates across a small diameter propellant module 32 at low voltage, and then transitions to the larger diameter propellant 34 where the majority of the energy is expended. In this manner, while the required voltage is dictated by the smaller diameter propellant, and is kept low, the discharge energy is dictated by the larger diameter propellant but can be delivered at low voltage through the use of larger-valued capacitors in the electronics. Since capacitor mass is primarily a function of the stored energy, changing to a lower voltage, higher capacitance energy storage at fixed energy has no mass impact on the thruster.

Figure 7:
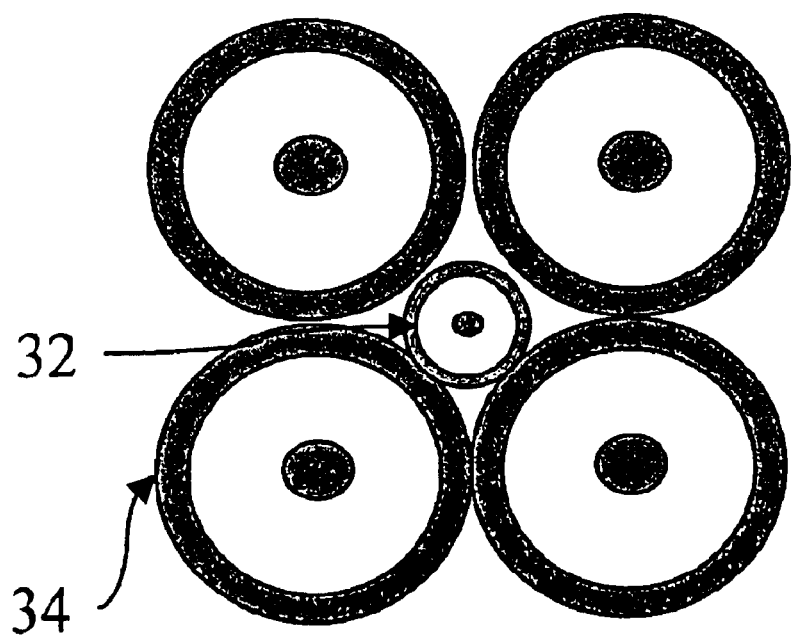
FIG. 7 is a schematic of a first embodiment of a two-stage micro pulsed plasma thruster according to the current invention.

For example, one exemplary embodiment of the two-stage propellant module design is shown in the schematics of FIG. 7 where a smaller diameter propellant 32 is embedded within a cluster of larger diameter propellants 34. High voltage is applied, using any of the three MicroPPT approaches: triggered, self-triggered, or quasi-steady (FIGS. 3, 4, and 5), to the tips of all of the propellants in parallel. The smaller diameter propellant 32 in the center ignites first at a voltage well below the surface breakdown voltage of the larger diameter propellants. Emission of plasma from this discharge enables the larger diameter propellants 34 to initiate a surface breakdown at relatively low voltage. Once the discharge has been initiated across the larger diameter propellant, the MicroPPT current transitions to the larger diameter due to a passive impedance designed into the current path of the smaller diameter propellant.

Figure 8:
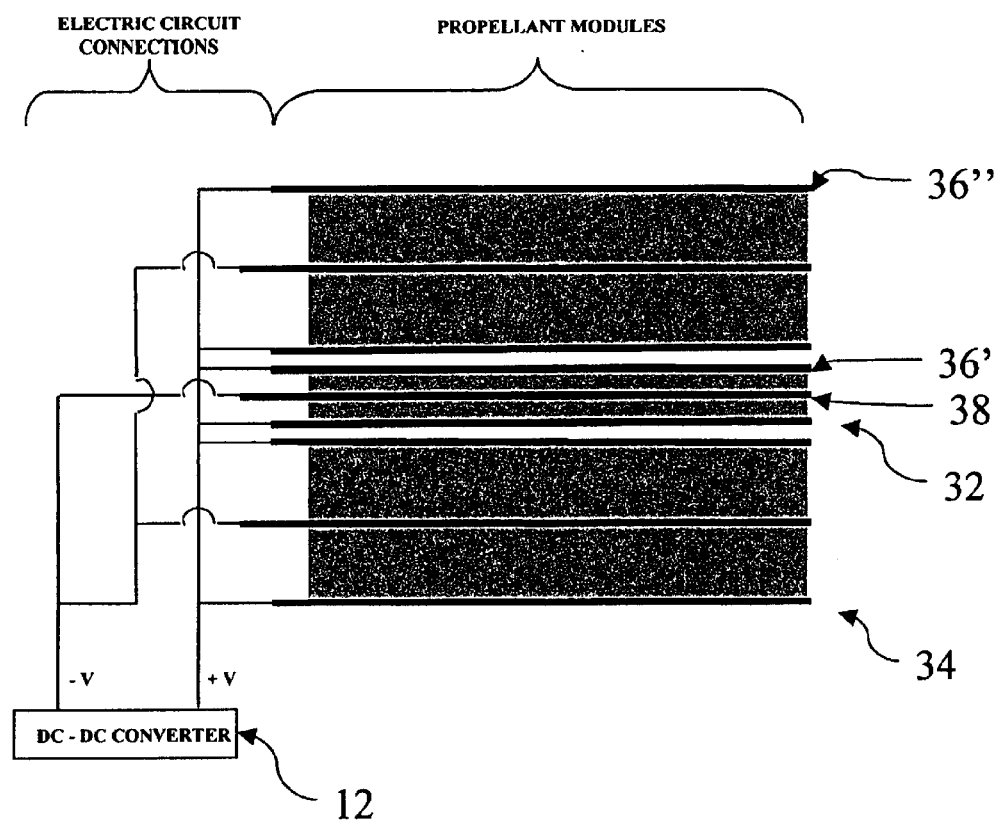
FIG. 8 is an electrical schematic of the first embodiment of a two-stage micro pulsed plasma thruster according to the current invention.

FIG. 8 shows a version of the electrical circuit that could energize for the two-stage propellant module design of FIG. 7. The high voltage source 12 applies positive electric potential to the outer electrodes 36' of the inner propellant 32 and the outer ring of propellant rods 36". Negative potential is applied the center electrodes 38 at each, with the center propellant rod having a high impedance placed in electrical series with the high voltage source. The high impedance can generally be either a resistor or inductance. Although not shown, a capacitor, if used, would be connected between the positive and negative terminals.

Figure 9:
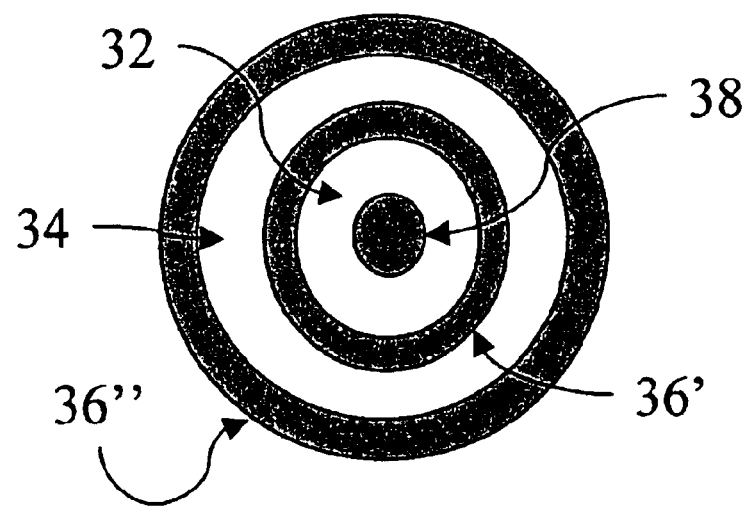
FIG. 9 is a schematic of a second embodiment of a two-stage micro pulsed plasma thruster according to the current invention.

A second exemplary embodiment of the two-stage propellant module design is shown in the schematic of FIG. 9, where the module has a coaxial arrangement. As shown, there are three separate electrodes. In the center is a small diameter rod ('center electrode') 38. Around this electrode is a small diameter annulus of propellant 32 followed by a relatively small diameter cylindrical electrode ('intermediate electrode') 36'. Around this is a larger annulus of propellant 34 followed by the large diameter outer shell electrode ('outer electrode') 36".

As with the previous method, the discharge ignites across the small diameter propellant annulus 32, and then transitions to the larger diameter annulus of propellant 34.

Electrically this can be accomplished through many combinations of electrode polarities that are each fundamentally the same in operation. For example, the high voltage can be applied to the center and outer electrodes while the intermediate electrode is held at ground potential. In this embodiment, the discharge ignites across the shorter current path between the center and intermediate electrodes at a voltage well below that needed to ignite a path between the intermediate and outer electrodes. Emission of plasma from this discharge enables a discharge between the intermediate and outer electrodes at low voltage. Once the discharge between the intermediate and outer electrodes has been initiated, the current transitions to this path due to a passive electrical impedance between the inner and intermediate electrodes.

Figure 10:
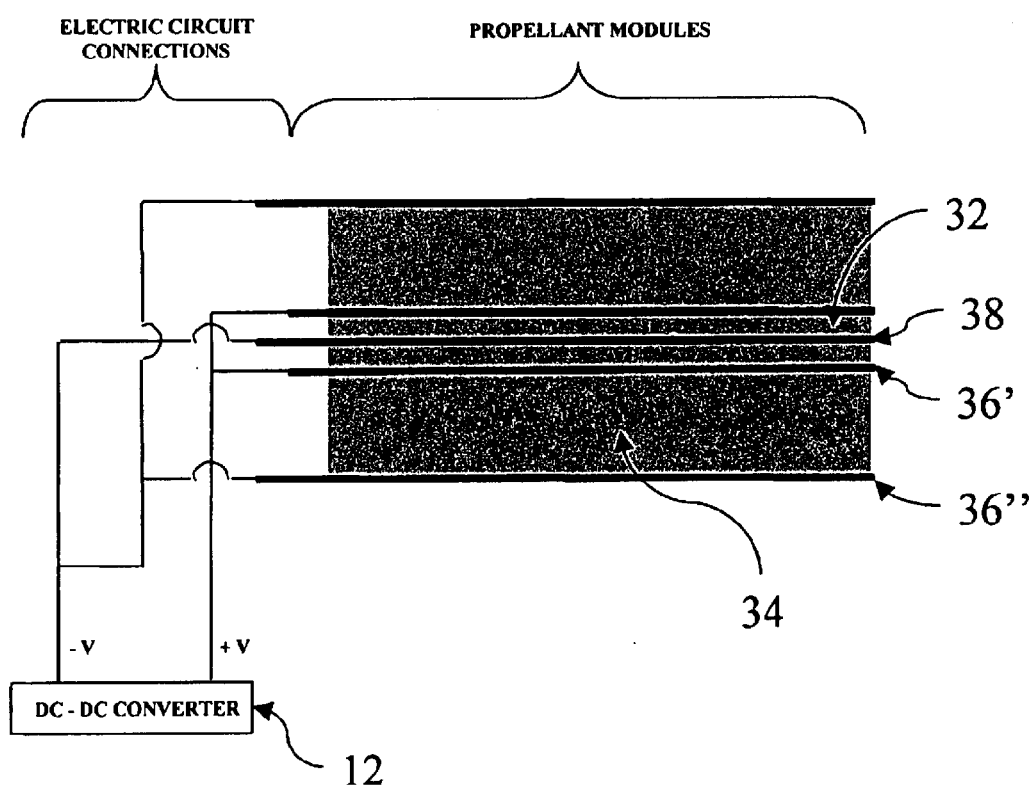
FIG. 10 is a first electrical schematic of the second embodiment of a two-stage micro pulsed plasma thruster according to the current invention.

FIG. 10 shows a version of the electrical circuit that could energize the coaxial two-stage propellant module design of FIG. 9. Positive voltage is supplied to the outer 36" and intermediate electrodes 36', negative to the center electrode 38. As the voltage to the intermediate electrode passes through a high impedance, it cannot be maintained once the discharge is initiated and the intermediate electrode will electrically float at the local discharge potential. Alternately, negative electric potential can applied to the center electrode and the outer electrode. Positive potential is then applied to the intermediate electrode.

Although FIGS. 8 and 10 show exemplary embodiments of how the two-stage propellant can be connected electrically, many variations of the specific connections are possible. For example, the polarity can be reversed. Alternatively, the circuit can be connected so that the high-energy discharge between the outer and intermediate electrodes is instead between the outer and center electrodes. It is the intent of this disclosure to claim all permutations known to people skilled in the art for the purpose of firing the bundled propellant designs shown in FIGS. 7 and 9.

Figure 11:
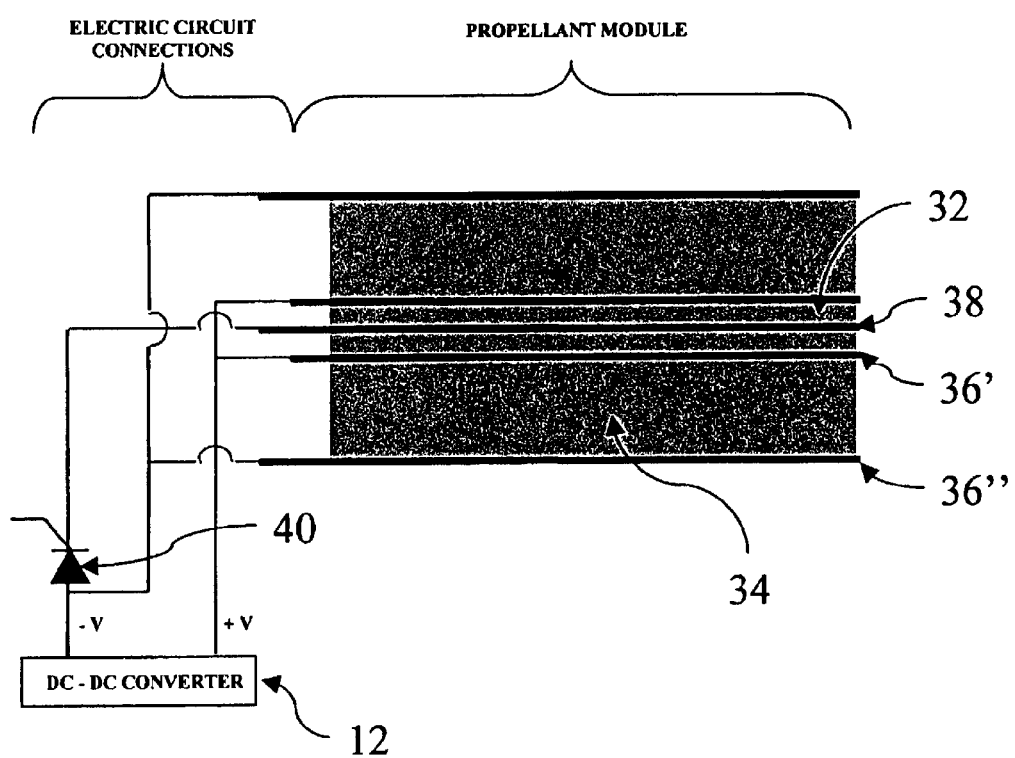
FIG. 11 is a second electrical schematic of the second embodiment of a two-stage micro pulsed plasma thruster according to the current invention.

For example, FIG. 11 shows a modification of the electrical schematic for the two-stage propellants where a switch 40 has been placed in the path of the innermost electrode. In this case the voltage is applied to the larger diameter annulus of propellant but the smaller diameter has no potential difference across it until the switch is closed. This technique is advantageous for allowing the propellant to achieve full voltage prior to a commanded fire event, similar to the triggered MicroPPT. A similar circuit can also be used in the clustered arrangement of FIG. 7.

The triggered configuration of FIG. 11 can also be used to selectively fire different two-stage propellant modules energized from the same high voltage source. In this scenario, several modules would have voltage applied while the capacitor was being charged. Upon fire command, only the selected module would be triggered and fire. This would allow controlled thrust in several directions, as required to perform spacecraft attitude control or precision stationkeeping, from a compact system with multiple propellant modules but only a single power supply and energy storage capacitor.

Figure 12:
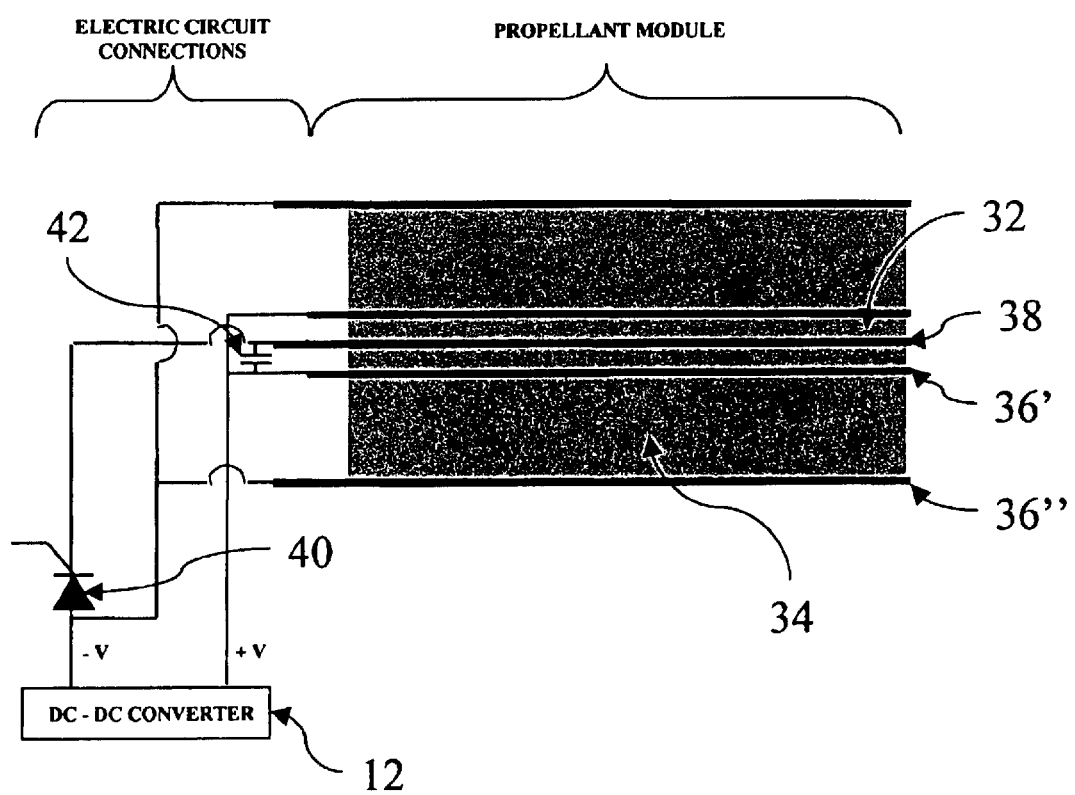
FIG. 12 is a third electrical schematic of the second embodiment of a two-stage micro pulsed plasma thruster according to the current invention.

FIG. 12 shows a modification of the electrical schematic for the two-stage propellants where a small capacitor 42 has been added between the center and intermediate electrodes. This capacitor can be designed to add a small amount of energy to the discharge across the small diameter propellant so that it fires more reliably over long periods of time by preventing char build-up. Typically this capacitor would have about 1/50 the energy of the discharge between the outer and intermediate electrodes, and would therefore have negligible impact on the energy efficiency.

Figure 13:
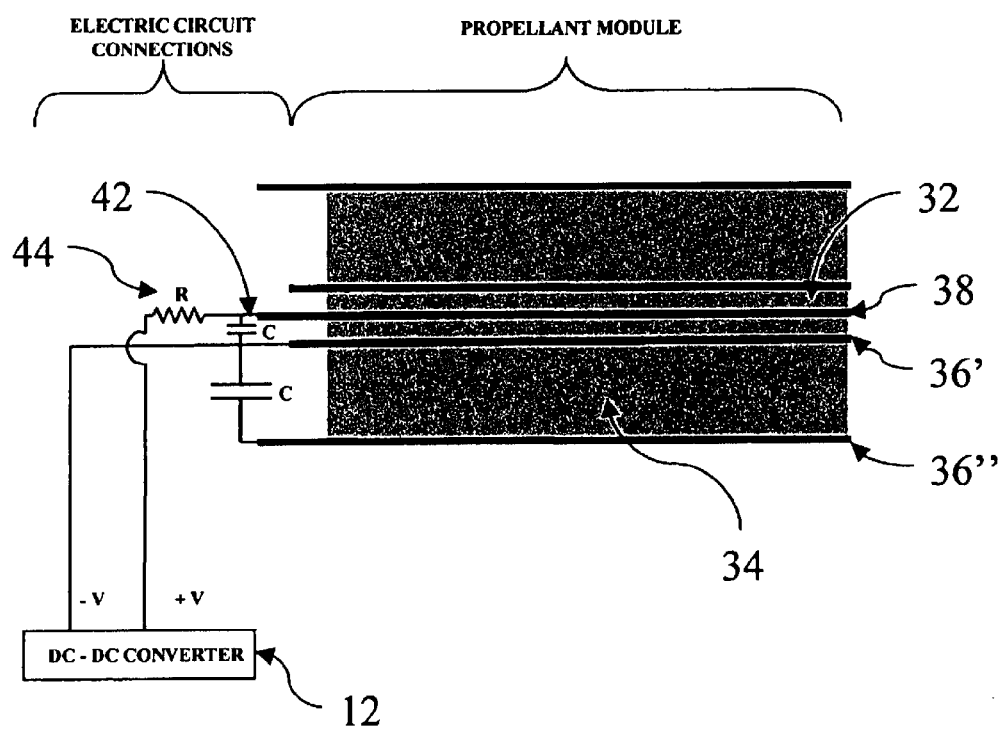
FIG. 13 is a fourth electrical schematic of the second embodiment of a two-stage micro pulsed plasma thruster according to the current invention.

FIG. 13 shows a further modification of the electrical schematic for the two-stage propellants where a small capacitor 42 and large resistor 44 have been connected in series from the primary capacitor to the small diameter propellant. In this scenario, the large capacitor charges quickly from the DC—DC converter. The smaller capacitor charges at a slower time (determined by the RC time constant of the small capacitor and large resistor). In this arrangement, the timing of the small diameter propellant voltage rise, and hence ignition, is controlled by the RC time constant. In such an embodiment, the frequency of the firing can be easily controlled. For example, if a high frequency is required (and hence power level), the RC time is reduced by decreasing R or C. If, however, a lower frequency and power level is required, the RC time is increased by increasing R or C.

The primary advantage of the electrical schematic of FIG. 13 is that the MicroPPT is more likely to fire when the large capacitor is at full voltage and energy. This reduces the potential for char build-up that can occur if the larger diameter propellant has a succession of discharges at lower voltages due to a temporary surface imperfection on the electrodes or propellant face that act to decrease the breakdown voltage.

In one exemplary embodiment of the thruster shown in FIG. 13, the propellant module has a 0.25" diameter for the large propellant 34, and a 0.1" diameter for the small propellant 32. In this embodiment, the large diameter propellant has a breakdown strength of between 25,000 volts and 40,000 volts, and requires about 5 J energy per discharge to prevent char formation. The smaller diameter propellant has a breakdown strength of between 3000 and 8000 volts and requires less than 1 J energy per discharge to prevent charring. The large capacitor has a value of 0.4 Farads and charges to 8000 volts in less than ½ second. The smaller capacitor has a value of 0.01 Farads. The resistor is typically around 500,000 Ohms, slowing the charge of the small capacitor so that it reaches 3000 volts in about 1 second and 8000 volts after about 3 seconds. If the smaller diameter consistently fires at 3000 volts, the MicroPPT will operate at 1 Hz. If the smaller diameter does not fire at 3000 volts, due to a temporary surface imperfection acting to increase the breakdown strength, the voltage of the small diameter propellant will continue to rise to 8000 volts over the next 2 seconds. At 8000 volts, the smaller diameter propellant is assured to fire since the applied voltage is well above the nominal firing voltage of 3000 volts. Therefore, the electrical design of the thruster shown in FIG. 13 also increases reliability.

For example, if a temporary surface imperfection occurs on the smaller diameter propellant so as to increase the breakdown voltage, the embodiment of the MicroPPT shown in FIG. 13 will automatically start firing at a lower frequency, but with a much higher discharge energy on the smaller diameter propellant. This higher energy discharge will act to clean any char from the smaller diameter propellant. Once cleaned, the MicroPPT will return to its nominal operating point of 3000 volts on the smaller diameter and a 1 Hz discharge frequency. This recovery occurs in a completely passive fashion with no command intercession required from the operator.

Although only two-stage propellant modules are discussed above, in an alternative embodiment the propellant module is of a bundled configuration. The bundled propellant module design is a direct enhancement of the propellant throughput from the baseline designs for the MicroPPT shown in FIGS. 3, 4, and 5. Unlike the two-stage design discussed above, the propellant rod 50 in the bundled design follows the conventional 2-electrode design with an inner electrode rod 52, surrounded by an annulus of propellant 54, which is then surrounded by an outer electrode tube 56. Alternatively, with obvious modifications to the circuit, the propellant rods can be of the two-stage assembly design.

Figure 14:
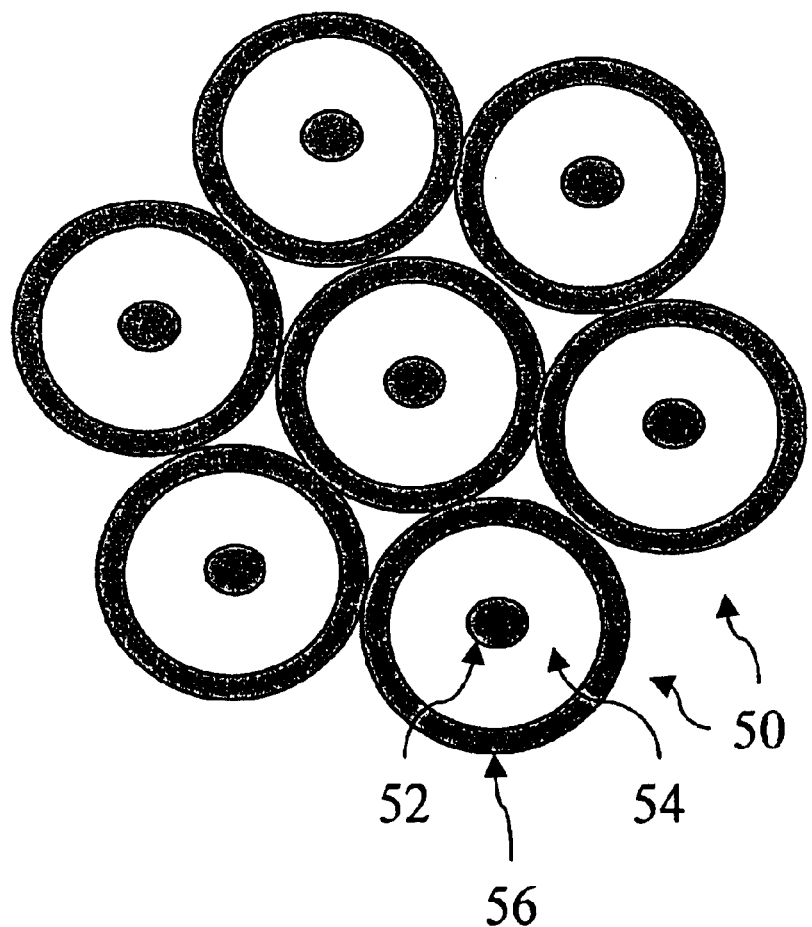
FIG. 14 is a schematic of an embodiment of a bundled micro pulsed plasma thruster according to the current invention.

However, as shown in FIG. 14, the bundled propellant modules 50 comprise several of these propellant rods grouped together into a cluster. In this design a single propellant rod X inches long can be replaced with N propellant rods in a bundle, each X/N in length. This eases the packaging requirements for missions requiring a significant amount of propellant, and minimizes the effects of possible thrust decreases that may occur as the propellant recedes back into the outer electrode shell. Of, course the latter concern is only an issue for the propellant feed mechanism shown in FIG. 6b and 6c. Thrust decreases due to wall collisions are not a concern if both electrodes recede with the propellant as shown in FIG. 6a.

Figure 15:
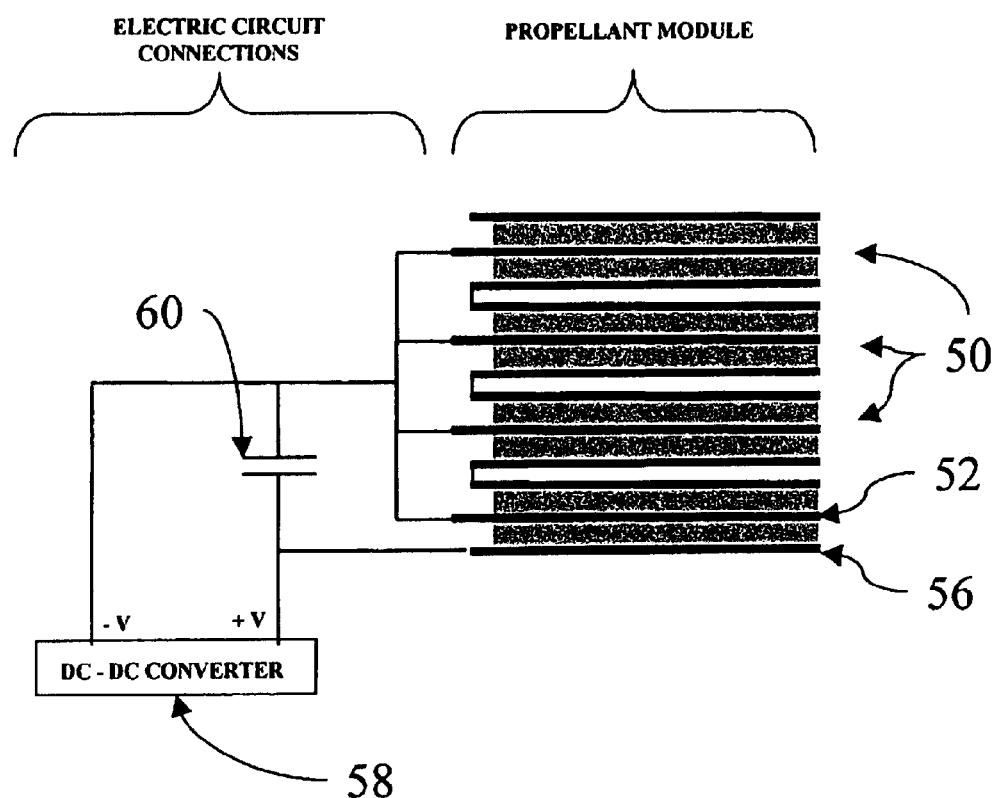
FIG. 15 is an electrical schematic of an embodiment of a bundled micro pulsed plasma thruster according to the current invention.

One possible electrical schematic for the Bundled Propellants is shown in FIG. 15 for a MicroPPT operated in the self-triggering mode of FIG. 4. The technique is equally applicable to the Triggered Mode of FIG. 3 and the Quasi-Steady mode of FIG. 5. In FIG. 15 the outer electrode shells 56 of each the propellant rods 50 are electrically connected in parallel to positive polarity. The inner electrode rods 52 are connected in electrical parallel to the negative polarity. A DC—DC converter 58 is used to charge a single capacitor 60, which is than electrically connected between the two polarities, and thus available to energize any of the propellant rods without preference. Although the schematic of FIG. 14 shows 7 propellant rods in the bundle, and the electrical schematic of FIG. 15 shows 4 propellant rods in the bundle, the technique is clearly extendable to any number of rods with the optimal choice dependent on the specific spacecraft application. The electrode polarity shown in FIG. 15 can also be reversed. In addition, by modifying the circuit similar to that of FIG. 13, a set of two-stage propellant assemblies can also be grouped into the bundle.

The key technical challenge for the propellant bundles 32 is how to use all of the propellant. When a thruster using the propellant bundles is initially energized the thruster will fire across one of the rods at random, and then often skip around between the various rods for a period of time. This skipping between rods is expected as the surface breakdown voltage of the individual rods changes in response to changes to the electrode and propellant surfaces that occurs with each discharge.

In a conventional design, as the propellants begin to recede, the thruster will choose one preferential rod, which will then experience all subsequent firings. As this process continues, the preferred rod will eventually consume all of its propellant. Generally when all of the propellant in a rod is consumed it leads to a thruster failure, where the electrical contacts to the propellant rod become electrically shorted. For a MicroPPT with a single propellant rod this is not a problem since the thruster has completed its mission and expended all of its propellant. However, for the bundled propellant design this failure of a single rod will cause the thruster to not be able to fire the neighboring propellant rods. Effectively, the bundled propellant MicroPPT would be left with 1 rod completely expended, and the remaining rods in the bundle still almost fully loaded with propellant. Accordingly, the key technical goal with the bundled propellant module design is the enable a single rod to fail gracefully in an open electrical circuit when it has expended all of its propellant so that the ignition would then proceed to use another neighboring propellant rod in the bundle.

Figure 16A:
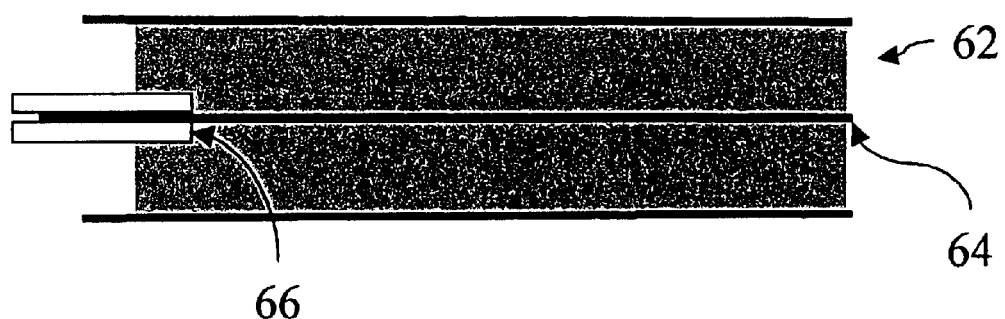
FIGS. 16a to 16c are schematics of embodiments of propellant rods according to the current invention.
Figure 16B:
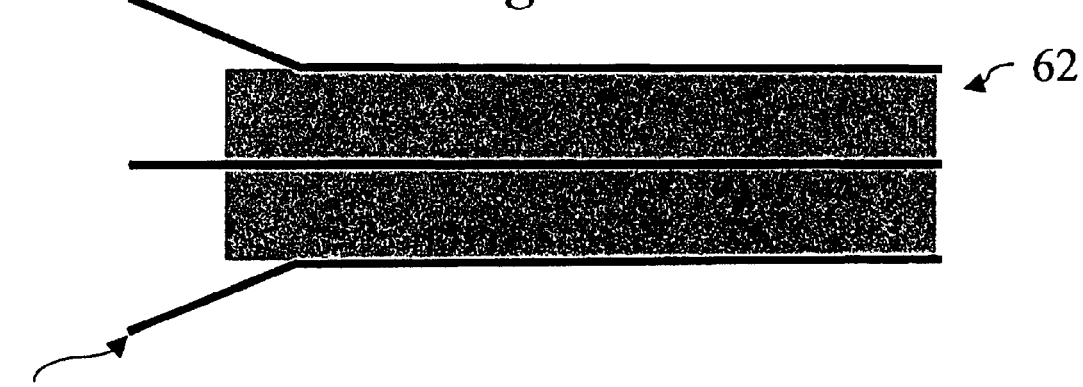
Figure 16C:
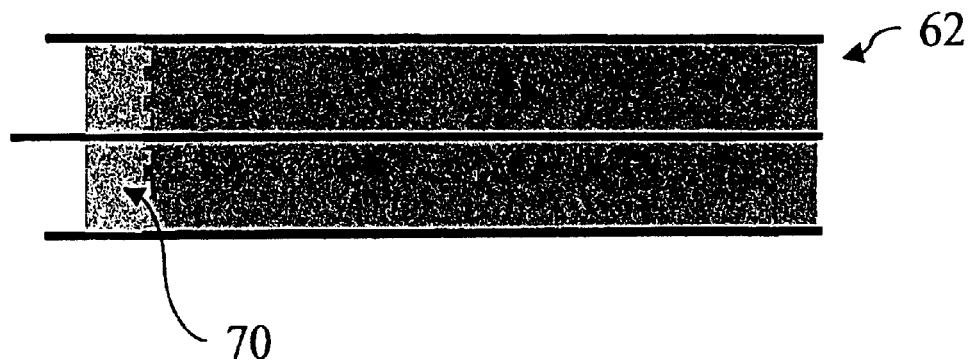

FIGS. 16a to 16c show possible methods for achieving an open-circuit condition when the propellant rod has expended all of its propellant. For example, FIG. 16a shows a propellant rod 62 design where the end-region of the inner electrode 64 is encased in an annulus of polyethylene 66 or some similar insulating plastic. In this embodiment, the propellant recedes back to the area of the polyethylene annulus the plastic material will begin to ablate and char. This char coating will increase the breakdown voltage of the propellant rod, and the discharge will shift to a neighboring rod with lower discharge voltage.

Alternatively, FIG. 16b shows a propellant rod 62 where the diameter of the outer electrode 68 is increased near the end region. When the propellant recedes to this area, the discharge path length and associated breakdown voltage will increase dramatically, and the discharge will shift to a neighboring rod with lower discharge voltage.

Meanwhile, FIG. 16c shows a propellant rod 62 design where a non-ablative plug 70 is inserted into the end-region of the propellant rod. Typical non-ablative materials include ceramics and silicates. When the propellant recedes to this region it will ablate the Teflon near to the surface of the non-ablative material. Key to the design is to cut grooves, slots, saw teeth, or any other geometric extension of the discharge path length into the face of the non-ablative material. Once the Teflon is ablated to an area near the non-ablative plug, the geometric extensions will cause the discharge path length, and hence the discharge voltage, to increase, and the discharge will shift to a neighboring rod with lower discharge voltage.

Another method of causing a propellant rod to quit firing after it has expended its propellant is by changing the density or thickness of the intermediate electrode. Since the ablation rate of an electrode is closely related to the heat capacity of the electrode, thinning the material will cause a faster ablation, as will changing the material itself Examples of this technique would include:

Making a notch around the circumference of the electrode. In such an embodiment, if the electrode material is 0.010" thick, then a notch or a thinning of the material to 0.005" thick would cause that portion to ablate faster and create a gap too large to the arc to the bridge.

Making axial slots in the electrode. In such an embodiment the slots will decrease the heat capacity in the remaining tube material, leading to an increase in electrode temperature, and a concomitant increase in the electrode erosion rate.

Replacing a portion of the electrode with another metal that has a greatly different heat capacity. In such an embodiment, the difference in heat capacity would force the propellant rod to quit firing in an open-circuit configuration. One possible scenario is if the end of the tube is Aluminum or Bismuth, the electrode will ablate faster. This will lead to an increased inter-electrode gap, and hence a higher surface breakdown voltage.

Although the propellant modules disclosed in the current invention have not be described for use in all of the PPT and MicroPPT devices described in FIGS. 1 to 6, it should be understood that the propellant modules of the current invention may be incorporate into any pulsed plasma thruster design capable of providing sufficient electrical ignition and having a suitable propellant module enclosure.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention.

Accordingly, the foregoing description should not be read as pertaining only to the precise structures described and illustrated in the accompanying drawings, but rather should be read consistent with and as support to the following claims which are to have their fullest and fair scope.

What is claimed is:

1. A pulsed plasma thruster propellant module comprising:
   at least one propellant rod including:
      a first stage having a first propellant source having dimensions defining a first stage discharge length;
      a second stage having a second propellant source having dimensions defining a second stage discharge length, wherein the first stage discharge length is less than the second stage discharge length; and
      an ignition source for generating an ignition discharge across the first stage discharge length, wherein the first and second stages are designed such that said ignition discharge across the first discharge length initiates a subsequent ignition discharge across the second discharge length.

2. The propellant module as described in claim 1, further comprising a passive impedance source designed to transmit the ignition discharge current from the first stage propellant source to the second stage propellant source.

3. The propellant module as described in claim 1, wherein the ignition source includes a power supply in electrical communication with at least one ignition electrode.

4. The propellant module as described in claim 3, further comprising a switch for connecting or disconnecting the electrical communication between the power supply and the at least one ignition electrode.

5. The propellant module as described in claim 1, wherein the ignition source comprises:
   a power supply;
   a first ignition electrode in electrical communication with the power supply;
   a second ignition electrode, wherein the first stage propellant source is disposed between the first and second ignition electrodes; and
   a third ignition electrode, wherein the second stage propellant source is disposed between the second and third ignition electrodes.

6. The propellant module as described in claim 5, wherein the first, second and third ignition electrodes are cylindrical and arranged in a coaxial geometry.

7. The propellant module as described in claim 5, wherein the first and second propellant sources are made of a non-conductive material.

8. The propellant module as described in claim 5, wherein the electrodes are made of a conducting metal.

9. The propellant module as described in claim 5, further comprising at least two propellant rods.

10. The propellant module as described in claim 5, further comprising a passive impedance in electrical communication between the first and second stage, wherein the passive impedance transfers the ignition discharge from the first stage to the second stage.

11. The propellant module as described in claim 5, further comprising a switch in electrical communication between the first and second stage for triggering the ignition discharge of the second stage.

12. The propellant module as described in claim 5, further comprising a trigger capacitor in electrical communication with the ignition source, wherein the trigger capacitor provides an additional quantum of discharge energy to the ignition discharge across the first stage propellant source.

13. The propellant module as described in claim 5, further comprising an RC circuit in electrical communication with the first stage, wherein the RC circuit impedes the voltage rise on the first stage and controls the firing frequency of the propellant module.

14. A propulsion unit comprising the propellant module described in claim 5.

15. The propellant module as described in claim 1, wherein the first and second stages comprise independent cylinders arranged in an adjacent relationship.

16. The propellant module as described in claim 15, wherein the first stage includes:
   a first ignition electrode in electrical communication with a power supply, and
   a second ignition electrode, wherein the first stage propellant source is disposed between the first and second ignition electrodes; and
   wherein the second stage includes:
   a third ignition electrode in electrical communication with the second ignition electrode, and
   a fourth ignition electrode, wherein the second stage propellant source is disposed between the third and fourth ignition electrodes.

17. The propellant module as described in claim 16, wherein the first and second electrodes are arranged in a coaxial geometry and form a first propellant cylinder, and wherein the third and fourth electrodes are arranged in a coaxial geometry and form a second propellant cylinder.

18. The propellant module as described in claim 15, wherein the first and second propellant sources are made of Teflon.

19. The propellant module as described in claim 15, wherein the electrodes are made of a conducting metal.

20. The propellant module as described in claim 15, further comprising a passive impedance in electrical communication between the first and second stage, wherein the passive impedance transfers the ignition discharge from the first stage to the second stage.

21. The propellant module as described in claim 15, further comprising a switch in electrical communication between the first and second stage for triggering the ignition discharge of the second stage.

22. The propellant module as described in claim 15, further comprising a trigger capacitor in electrical communication with the ignition source, wherein the trigger capacitor provides an additional quantum of discharge energy to the ignition discharge across the first stage propellant source.

23. The propellant module as described in claim 15, further comprising an RC circuit in electrical communication with the first stage, wherein the RC circuit impedes the voltage rise on the first stage and controls the firing frequency of the propellant module.

24. The propellant module as described in claim 15, further comprising at least two second stages.

25. The propellant module as described in claim 24, further comprising a selector switch in electrical communication with the ignition source, wherein the selector switch determines which of the at least two second stages is ignited by the ignition discharge of the first stage.

26. A propulsion unit comprising the propellant module described in claim 15.

27. The propellant module as described in claim 1, further comprising:
   a power source for generating an ignition voltage;
   a bundle of at least two propellant rods in electrical communication with the power source, the at least two propellant rods each including:
      a first electrode,
      a second electrode, and
      a propellant source disposed between the first and second electrodes having dimensions defining a discharge length; wherein the power source randomly applies the ignition voltage to one of the at least two propellant rods to generate an ignition discharge across the discharge length of said propellant rod until the propellant source within each propellant rod is exhausted.

28. The propellant module as described in claim 27, wherein the ignition discharge is triggered by a triggering technique selected from the group consisting of:
   self-triggered, triggered, and quasi-steady.

29. The propellant module of claim 27 wherein each of the at least two propellant rods are designed to enter an open-circuit condition such that no further ignition discharges occur across said discharge length once the propellant source has been expended.

30. The propellant module of claim 27 wherein each of the at least two propellant rods further comprises an insulating tube surrounding one end of the first electrode such that when the propellant source has been depleted sufficiently to expose the insulating tube an open-circuit condition is entered such that no further ignition discharges occur across the discharge length.

31. The propellant module of claim 27 wherein each of the at least two propellant rods further comprises a non-ablative material disposed between the first and second electrodes at one end of the propellant rod such that when the propellant source has been depleted sufficiently to expose the non-ablative material an open-circuit condition is entered such that no further ignition discharges occur across the discharge length.

32. The propellant module of claim 27 wherein the discharge length between the first and second electrodes of each of the at least two propellant rods increases at one end of the propellant rod such that when the propellant source has been depleted sufficiently to reach the increased discharge length an open-circuit condition is entered such that no further ignition discharges occur across said increased discharge length.

33. The propellant module as described in claim 27, further comprising a propellant rod switch for directing the ignition voltage between the at least two propellant modules.

34. A propulsion unit comprising the propellant module described in claim 27.

35. A propulsion unit comprising the propellant module described in claim 1.

* * * * *